(12) United States Patent
Volz et al.

(10) Patent No.: US 11,927,229 B2
(45) Date of Patent: Mar. 12, 2024

(54) DRUM BRAKE FOR A MOTOR VEHICLE

(71) Applicant: Continental Teves AG & Co. OHG, Frankfurt am Main (DE)

(72) Inventors: Christian Volz, Frankfurt am Main (DE); André Teske, Frankfurt am Main (DE); Stefan Heinz, Frankfurt am Main (DE)

(73) Assignee: Continental Teves AG & Co. OHG (DE)

( * ) Notice: Subject to any disclaimer, the term of this patent is extended or adjusted under 35 U.S.C. 154(b) by 98 days.

(21) Appl. No.: 17/619,665

(22) PCT Filed: Jun. 24, 2020

(86) PCT No.: PCT/EP2020/067641
§ 371 (c)(1),
(2) Date: Dec. 16, 2021

(87) PCT Pub. No.: WO2020/260360
PCT Pub. Date: Dec. 30, 2020

(65) Prior Publication Data
US 2022/0356920 A1 Nov. 10, 2022

(30) Foreign Application Priority Data
Jun. 28, 2019 (DE) .................... 10 2019 209 518.6

(51) Int. Cl.
*F16D 65/00* (2006.01)
*B60T 1/06* (2006.01)
(Continued)

(52) U.S. Cl.
CPC .......... *F16D 65/0031* (2013.01); *B60T 1/067* (2013.01); *F16D 51/20* (2013.01); *F16D 2051/001* (2013.01)

(58) Field of Classification Search
CPC ................. F16D 65/0031; F16D 51/20; F16D 2051/001; B60T 1/067
See application file for complete search history.

(56) References Cited

U.S. PATENT DOCUMENTS

| 1,919,343 A | 7/1933 | Payne |
| 1,974,565 A | 9/1934 | Gallup |

(Continued)

FOREIGN PATENT DOCUMENTS

| CN | 106164525 A | 11/2016 |
| CN | 107218319 A | 9/2017 |

(Continued)

OTHER PUBLICATIONS

Japanese Notice of Reasons for Refusal for Japanese Application No. 2021-573270, dated Jan. 11, 2023 with translation, 11 pages.

(Continued)

*Primary Examiner* — Melanie Torres Williams
(74) *Attorney, Agent, or Firm* — Buchanan, Ingersoll & Rooney PC

(57) ABSTRACT

A drum brake for a motor vehicle has a pocket for collecting abraded brake particles. The pocket is accessible from above via an opening. After the introduction of a suction device into the opening, the abraded brake particles can be extracted by suction. Pollution of the environment with abraded brake particles is thereby avoided.

12 Claims, 3 Drawing Sheets

(51) Int. Cl.
   *F16D 51/20* (2006.01)
   *F16D 51/00* (2006.01)

(56) References Cited

U.S. PATENT DOCUMENTS

| | | | |
|---|---|---|---|
| 1,995,691 | A | 3/1935 | Stough et al. |
| 2,042,750 | A | 6/1936 | Halteren |
| 2,091,865 | A | 8/1937 | Leveen |
| 3,000,472 | A | 9/1961 | Sturgis |
| 5,162,053 | A | 11/1992 | Kowalski, Jr. |
| 9,017,462 | B2 | 4/2015 | Gelb |

FOREIGN PATENT DOCUMENTS

| | | | | |
|---|---|---|---|---|
| CN | 207034042 | U | | 2/2018 |
| CN | 207728774 | U | | 8/2018 |
| DE | 19643869 | A1 | | 5/1998 |
| DE | 19846887 | A1 | * | 4/2000 ......... F16D 65/0031 |
| EP | 2725256 | B1 | | 2/2017 |
| GB | 2533476 | A | * | 6/2016 ............. B60T 17/00 |
| JP | 52168179 | U | | 12/1977 |
| JP | 5617428 | U | | 2/1981 |
| JP | 5934129 | U | | 3/1984 |
| JP | 61182427 | U | | 11/1986 |
| WO | 2018054821 | A1 | | 3/2018 |

OTHER PUBLICATIONS

International Search Report and Written Opinion for International Application No. PCT/EP2020/067641, dated Jul. 29. 2020, with partial English translation, 7 pages.

German Search Report for German Application No. 10 2019 209 518.6, dated Feb. 3, 2020, with English translation, 12 pages.

Chinese Office Action for Chinese Application No. 202080046622.1, dated Apr. 18, 2023 with translation, 7 pages.

Korean Request for the Submission of an Opinion for Korean Application No. 10-2021-7040437, dated Aug. 8, 2023 with translation, 11 pages.

* cited by examiner

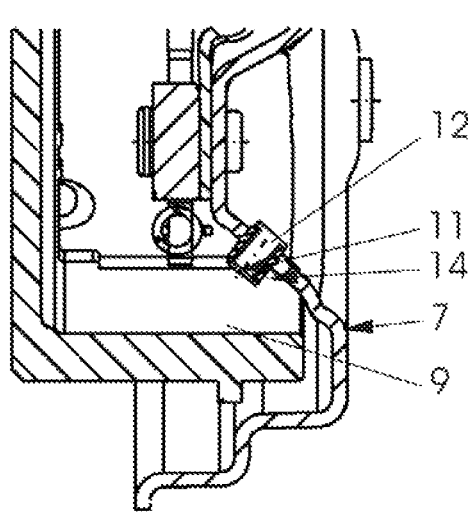
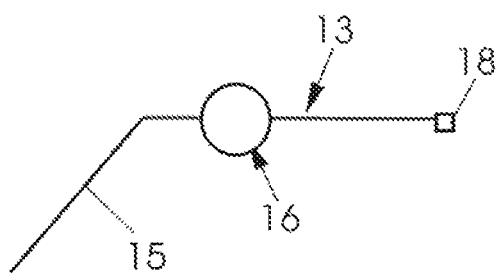
FIG 2
FIG 3
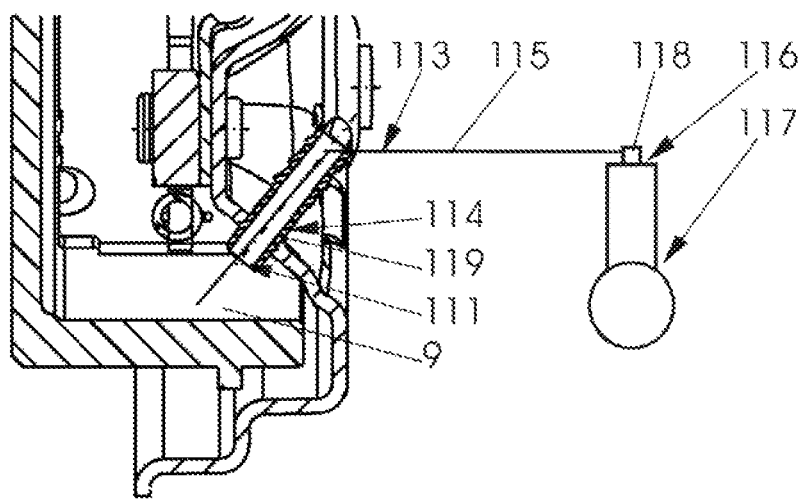
FIG 4

DRUM BRAKE FOR A MOTOR VEHICLE

CROSS REFERENCE TO RELATED APPLICATIONS

This application is the U.S. National Phase Application of PCT International Application No. PCT/EP2020/067641, filed Jun. 24, 2020, which claims priority to German Patent Application No. 10 2019 209 518.6, filed Jun. 28, 2019, the contents of such applications being incorporated by reference herein.

FIELD OF THE INVENTION

The invention relates to a drum brake for a motor vehicle having a rotatably mounted brake drum, having a radially inward-facing friction surface, having brake linings arranged radially inside the friction surface, having an actuator for preloading the brake linings against the friction surface, and having an anchor plate for holding the actuator, having an opening for discharging abraded brake particles from the brake drum, and having a cover for the brake drum.

BACKGROUND OF THE INVENTION

A drum brake of this kind is known from WO 2018/054821 A1, incorporated by reference herein. In the case of this drum brake, an opening with a horizontal axis, to which a suction device provided with a dust extraction unit is connected, is arranged on the cover, directly adjacent to the brake drum. The purpose of the suction device is to extract accumulating brake dust and to prevent it from being emitted into the environment.

However, the disadvantage with the known drum brake is that the arrangement of the opening with the horizontal axis is unfavorable for extraction by suction. Moreover, continuous extraction by suction is necessary with this arrangement of the opening.

SUMMARY OF THE INVENTION

An aspect of the invention is based on the problem of developing a drum brake of the type mentioned in the introduction in such a way that the abraded brake particles can be removed in a simple manner.

According to an aspect of the invention, this problem is solved by virtue of the fact that the cover delimits a pocket for collecting abraded brake particles.

By means of this configuration, the pocket enables the abraded brake particles to accumulate. After an intended time or an intended level of abraded brake particles has been reached, they can be removed from the pocket via the opening, e.g. by extraction by suction. It is a particularly simple matter to remove the abraded brake particles from the pocket. Continuous extraction by suction is therefore not necessarily required.

According to another advantageous development of the invention, the pocket is structurally particularly simple if the opening is spaced apart from the base region of the cover. By virtue of this configuration, the abraded brake particles collect below the opening owing to gravity, and therefore exposing the opening does not lead to accidental escape of abraded brake particles. Since the opening is spaced apart from the base region of the anchor plate, unintentional release of abraded brake particles while they are being removed is avoided.

According to another advantageous development of the invention, the discharge of the abraded brake particles is particularly simple if the opening opens into a collecting funnel projecting into the pocket. The collecting funnel makes it possible to collect the abraded brake particles which form. As they arise, the abraded brake particles are therefore moved away from the pair consisting of the brake linings and the brake drum and are collected in the collecting funnel. Furthermore, the flow during the discharge of the abraded brake particles can be influenced by means of the collecting funnel.

According to another advantageous development of the invention, particularly reliable collection and discharge of the abraded brake particles is particularly simple if the collecting funnel is arranged between two brake linings and directly above the inner side of the brake drum and has a trough shape for collecting the abraded brake particles.

According to another advantageous development of the invention, it is a simple matter to delimit the dimensions of the pocket if the cover has a vertical section, if the vertical section forms a partial region of the pocket, and if the opening is arranged above the vertical section.

According to another advantageous development of the invention, the cover is structurally particularly simple if the anchor plate and the cover are manufactured in one piece.

According to another advantageous development of the invention, the drum brake is particularly inexpensive if the opening is closed by a plug. The plug can be removed during inspection, and a suction tube for the extraction of the abraded brake particles by suction can be introduced into the pocket.

According to another advantageous development of the invention, it contributes to simplifying continuous or discontinuous removal of the abraded brake particles if the opening has a connection for a suction line. During an inspection of the motor vehicle, for example, the suction line can be connected to the connection, or can be kept continuously connected for continuous extraction by suction.

According to another advantageous development of the invention, continuous extraction of the abraded brake particles by suction is a particularly simple matter if the opening is connected to an air filter.

According to another advantageous development of the invention, it is possible to avoid the arrangement of a suction fan that has to be installed separately if the opening is connected to an intake tract of an internal combustion engine. By virtue of this configuration, the abraded brake particles are retained in the air filter, which is present in any case.

According to another advantageous development of the invention, it contributes to simplifying the extraction of the abraded brake particles by suction if the pocket has on its upper side a section which slopes relative to the vertical section, and if the opening is arranged in the sloping section. By virtue of this configuration, accessibility of the pocket from above is ensured.

According to another advantageous development of the invention, it is a simple matter to fix the suction line permanently on the opening if the opening has a tubular nozzle.

BRIEF DESCRIPTION OF THE DRAWINGS

The invention permits numerous embodiments. To further illustrate its basic principle, a number of these embodiments are illustrated in the drawing and will be described in the following text. In the drawing:

FIG. 2 shows a partial region of a first embodiment of the drum brake from FIG. 1, FIG. 3 shows a suction means for connection to the drum brake from FIG. 2, FIG. 4 shows a partial region of a second embodiment of the drum brake from FIG. 1.

DETAILED DESCRIPTION OF THE PREFERRED EMBODIMENTS

Figure 1:
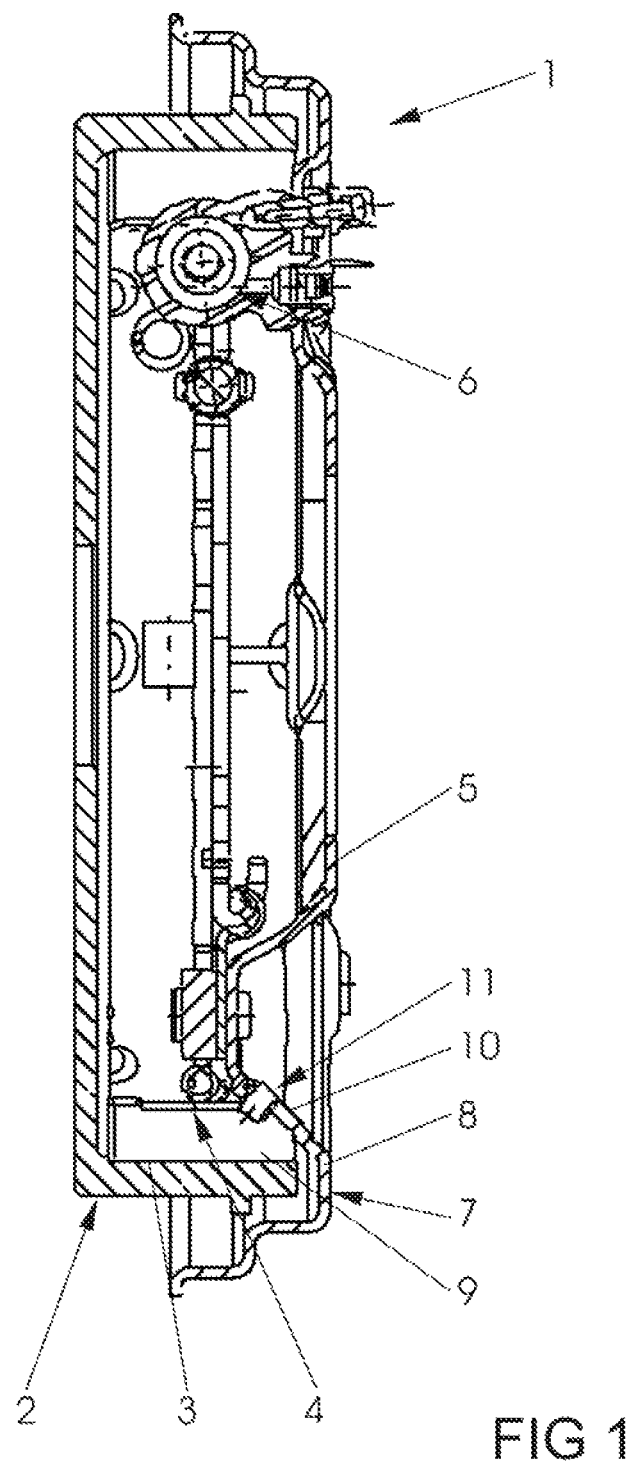
FIG. 1 shows in simplified form a longitudinal section through a drum brake.
Figure 6:
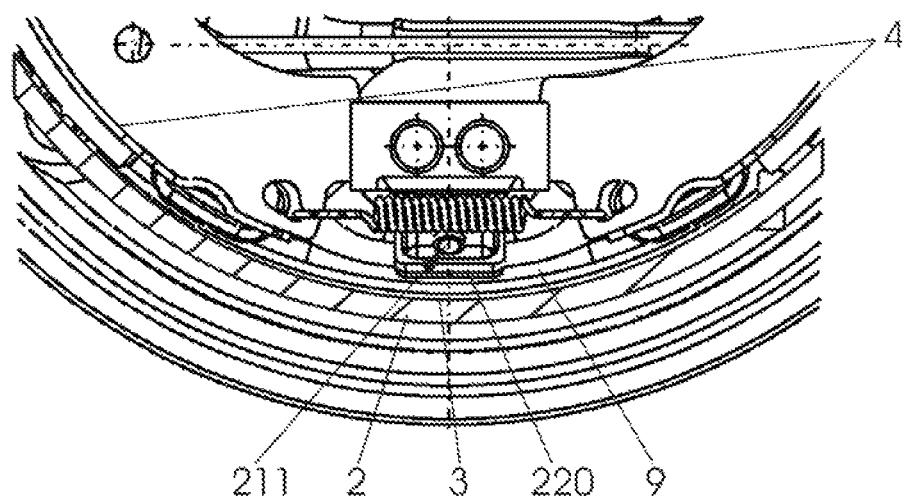
FIG. 6 shows a sectional illustration of the embodiment according to FIG. 3 along the line VI-VI.

FIG. 1 shows in simplified form a longitudinal section through a drum brake 1 of a motor vehicle having a rotatably mounted brake drum 2 and a radially inward-facing friction surface 3. Radially inside the friction surface 3, brake linings 4 are situated opposite the brake drum 2. The brake linings 4 are arranged in pairs, as illustrated in FIG. 6. The brake linings 4 are held on an anchor plate 5 and can be pressed against the friction surface 3 by an actuator 6. The anchor plate 5 has a cover 7, which fits over a partial region of the brake drum 2. A pocket 9, in which abraded brake particles collect, is arranged between the brake drum 2 and a vertical section 8 of the cover 7. The anchor plate 5 has an opening 11 in a sloping section 10 arranged above the vertical section 8. The cover 7, which is manufactured in one piece with the anchor plate 5 in the exemplary embodiment under consideration, seals off the pocket 9 from the environment, thus preventing abraded brake particles from being introduced into the environment.

FIG. 2 shows on an enlarged scale the lower partial region of the drum brake 1 from FIG. 1 in the region of the opening 11. The opening 11 is closed by a plug 12. After removal of the plug 12, a suction means 13 illustrated in FIG. 3 can be introduced through a connection 14 of the opening 11 and can extract the abraded brake particles by suction.

FIG. 3 shows schematically a suction means 13 for connection to the opening 11 from FIG. 2. The suction means 13 has a suction line 15 for introduction into the opening 11, a fan 16 and an air filter 18. When the suction line 15 is introduced into the opening 11, the free end of the suction line 15 gets as far as the base region of the pocket 9. The abraded brake particles can then be extracted by suction by means of the fan 16 and collected in the air filter 18.

FIG. 4 shows another embodiment of the lower partial region of the drum brake 1 from FIG. 1 with an opening 111. The opening 111 has a tubular connection 114, on which a suction means 113 is mounted. The suction means 113 leads via a suction line 115 to an intake tract 116 of an internal combustion engine 117 of the motor vehicle. In this case, the suction line 115 is taken as far as the base region of the pocket 9. The abraded brake particles are thereby extracted continuously by suction and collected in an air filter 118 of the internal combustion engine 117. For permanent fixing of the suction line 115, the connection 114 has a tubular nozzle 119. In other respects, the embodiment is configured in the same way as that from FIG. 2.

Figure 5:
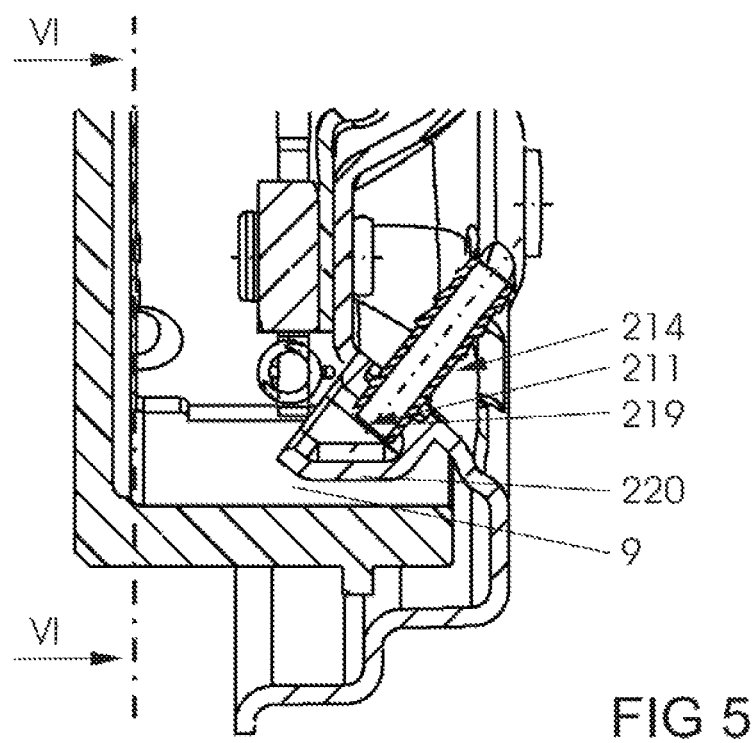
FIG. 5 shows a partial region of a third embodiment of the drum brake from FIG. 1.

FIG. 5 shows another embodiment of the lower partial region of the drum brake 1 from FIG. 1 with an opening 211. As in the embodiment according to FIG. 4, the opening 211 has a tubular connection 214 for a suction means (not illustrated here). The tubular connection 214 has a tubular nozzle 219. A collecting funnel 220 projects into the pocket 9, which is constructed as in the case of the embodiments described above. The collecting funnel 220 projects as far as a location directly in front of the friction surface 3 of the brake drum 2 and has a trough shape for the purpose of collecting the abraded brake particles.

FIG. 6 shows a sectional illustration through the embodiment according to FIG. 5 along the line VI-VI. Here, it can be seen that the collecting funnel 220 is arranged between two brake linings 4.

The invention claimed is:

1. A drum brake for a motor vehicle comprising:
   a rotatably mounted brake drum, having a radially inward-facing friction surface;
   brake linings arranged radially inside the friction surface;
   an actuator for preloading the brake linings against the friction surface;
   an anchor plate for holding the actuator, having an opening for discharging abraded brake particles from the brake drum; and
   a cover for the brake drum, the cover defining a pocket for collecting abraded brake particles, and the opening projecting into the pocket.

2. The drum brake as claimed in claim 1, wherein the opening is spaced apart from the base region of the cover.

3. A drum brake for a motor vehicle comprising:
   a rotatably mounted brake drum, having a radially inward-facing friction surface;
   brake linings arranged radially inside the friction surface;
   an actuator for preloading the brake linings against the friction surface;
   an anchor plate for holding the actuator, having an opening for discharging abraded brake particles from the brake drum; and
   a cover for the brake drum,
   wherein the cover delimits a pocket for collecting abraded brake particles, and
   wherein the opening opens into a collecting funnel projecting into the pocket.

4. The drum brake as claimed in claim 3, wherein the collecting funnel is arranged between two brake linings and directly above the inner side of the brake drum and has a trough shape for collecting the abraded brake particles.

5. The drum brake as claimed in claim 1, wherein the cover has a vertical section, and the vertical section has a partial region which forms the pocket, and in that the opening is arranged above the vertical section.

6. The drum brake as claimed in claim 1, wherein the anchor plate and the cover are manufactured in one piece.

7. The drum brake as claimed in claim 1, wherein the opening is closed by a plug.

8. The drum brake as claimed in claim 1, wherein the opening has a connection for a suction line.

9. The drum brake as claimed in claim 1, wherein the opening is connected to an air filter.

10. The drum brake as claimed in claim 1, wherein the opening is connected to an intake tract of an internal combustion engine.

11. A drum brake for a motor vehicle comprising:
    a rotatably mounted brake drum, having a radially inward-facing friction surface;
    brake linings arranged radially inside the friction surface;
    an actuator for preloading the brake linings against the friction surface;
    an anchor plate for holding the actuator, having an opening for discharging abraded brake particles from the brake drum; and a cover for the brake drum,
wherein the cover delimits a pocket for collecting abraded brake particles, and
wherein the pocket has on its upper side a section which slopes relative to a vertical section, and the opening is arranged in a sloping section.

12. The drum brake as claimed in claim 1, wherein the opening has a tubular nozzle.

* * * * *